United States Patent [19]
Marcus et al.

[11] Patent Number: 4,492,404
[45] Date of Patent: Jan. 8, 1985

[54] VISOR ACTUATING MECHANISM

[75] Inventors: Konrad H. Marcus; Dennis J. Fleming, both of Holland, Mich.

[73] Assignee: Prince Corporation, Holland, Mich.

[21] Appl. No.: 453,530

[22] Filed: Dec. 27, 1982

[51] Int. Cl.³ ............................................. B60J 3/02
[52] U.S. Cl. .................................................. 296/97 J
[58] Field of Search ................ 296/97 J, 97 H, 97 K; 49/379; 160/DIG. 3

[56] References Cited
U.S. PATENT DOCUMENTS

| | | | |
|---|---|---|---|
| 2,100,427 | 11/1937 | Blocker | 296/97 J |
| 2,101,901 | 12/1937 | Fletcher | 296/97 G |
| 2,122,120 | 6/1938 | Thode | 296/97 J |
| 2,446,866 | 8/1948 | Bell | 296/97 K |
| 2,607,906 | 8/1952 | Sang | 296/97 J |

Primary Examiner—Robert R. Song
Attorney, Agent, or Firm—Price, Heneveld, Huizenga & Cooper

[57] ABSTRACT

A visor actuating mechanism includes a bias spring coupled to the visor's moveable control elements tending to urge the visor body into a lowered position and a releasable catch for holding the visor in a stored position against the force provided by the bias spring. In one embodiment of the invention, the releasable catch was an electrically actuated solenoid coupled to a locking arm which, when the solenoid is actuated by an electrical push-button switch, effects release of the latching mechanism to permit the bias spring to urge the visor downwardly from the stored position.

17 Claims, 3 Drawing Figures

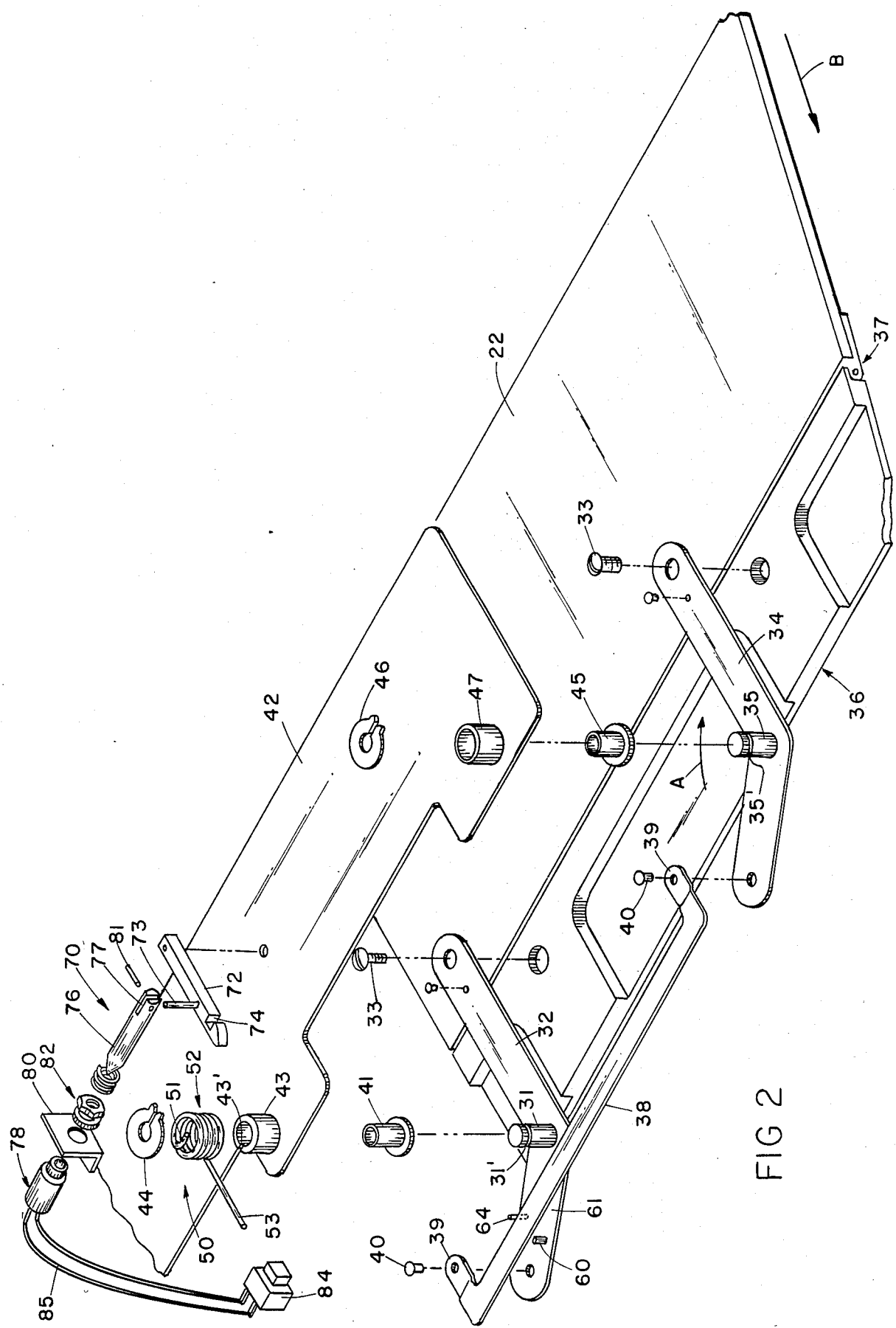

4,492,404

VISOR ACTUATING MECHANISM

BACKGROUND OF THE INVENTION

The present invention relates to vehicle visors and particularly to a mechanism for automatically moving visors from a stored position.

In conventional visors, which pivot on a rod, such visors are manually moved by the user by grasping the visor body to rotate it from a raised stored position to a lowered use position. U.S. patent application, Ser. No. 403,567, filed on July 30, 1982, and entitled CONCEALED VISOR, discloses a visor which swings down to a use position from a concealed position stored within a vehicle headliner and employs a parallel arm construction to provide such movement. In this system, the visor is manually moved by the user by grasping a small handle positioned on the lower edge of the visor.

SUMMARY OF THE PRESENT INVENTION

The visor construction of the present invention provides a releasable spring bias mechanism by which a visor can be automatically moved by the actuation of a push-button to a lowered use position thus, providing convenient operation of the visor by the user.

Apparatus embodying the present invention includes a visor panel and means for mounting the visor body to a vehicle headliner for movement generally between a lowered use position and a raised stored position above the vehicle windshield and adjacent the vehicle headliner. Coupled to the mounting means is bias means tending to urge the visor body into a lowered position and a releasable catch for holding the visor in a stored position against the force provided by the bias means.

In one embodiment of the invention, the releasable catch was an electrically actuated solenoid coupled to a locking arm which, when the solenoid is actuated by an electrical push-button switch, effects release of the latching mechanism to permit the bias means to urge the visor downwardly from the stored position.

These and other objects, features and advantages of the present invention will become apparent upon reading the following description thereof together with reference to the accompanying drawings in which:

BRIEF DESCRIPTION OF THE DRAWINGS

FIG. 2 is an enlarged, exploded, fragmentary view of the visor mechanism of the present invention in a visor lowered position and viewed from a direction above and opposite that shown in FIG. 1.

DETAILED DESCRIPTION OF THE PREFERRED EMBODIMENT

Figure 1:
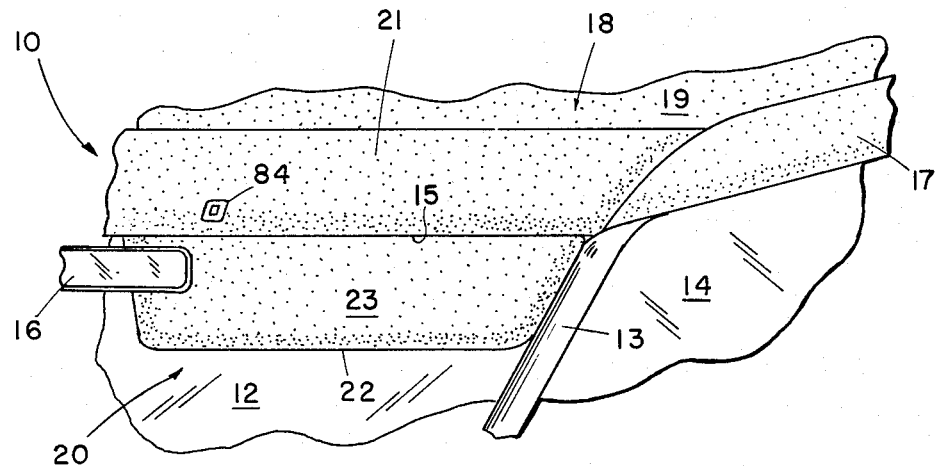
FIG. 1 is a fragmentary, perspective view of a visor installation embodying the present invention.

Referring initially to FIG. 1, there is shown a right front interior of a vehicle 10 which includes a windshield 12, a right side, front passenger side window 14 and a rearview mirror 16. An angled support post 13 extends between the side window and windshield. Extending above the windshield is the ceiling or headliner area 18 of the vehicle which typically is upholstered with a fabric 19 conforming to the vehicle's general interior decor. The headliner frequently will include a snap-in upholstered panel conventionally secured to the sheet metal roof of the vehicle by means of conventional mounting structure adapted to receive snapfasteners, screws or the like. Extending along the lower edge of the headliner, just above the passenger window 14, is an integral side window visor assembly module 17 of the type described in a co-pending U.S. patent application, Ser. No. 392,240, filed on June 25, 1982 and entitled SIDE WINDOW VISOR.

Figure 3:
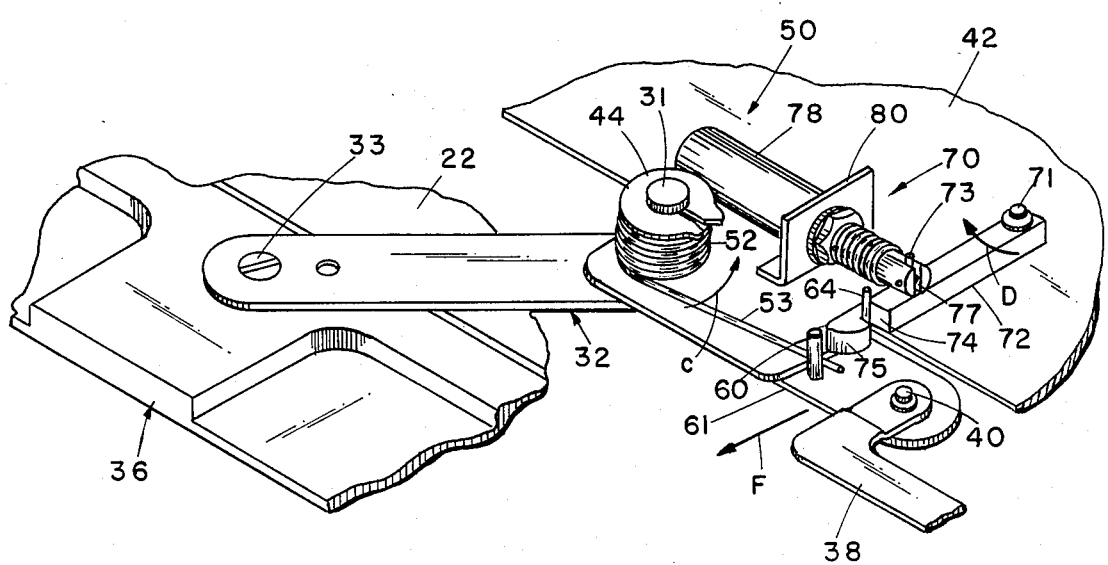
FIG. 3 is an enlarged, fragmentary, perspective view of the visor control mechanism of the present invention shown in a visor latched position.

In FIG. 1, a front right visor assembly 20 is shown in its lowered use position extended from an opening 15 on the lower edge and between the windshield frame 13 and an upholstered cover panel 21 for the visor assembly 20. Panel 21 extends just above windshield 12 and across the top thereof to provide a decorative cover for substantially identical left and right visor assemblies, with only the right visor assembly being illustrated. The construction and operation of the mounting components of the visor assembly 20 is disclosed in greater detail in the above identified patent application entitled CONCEALED VISOR, Ser. No. 403,567, the disclosure of which is incorporated herein by reference. Basically, as seen in FIG. 2, the visor assembly 20 includes a visor body or panel 22 which, as seen in FIG. 1, is covered by upholstery material 23 (FIG. 1) conforming to the vehicle's interior upholstery. The underlying visor body or panel 22 is coupled to a pair of dog leg-shaped, generally parallel pivot arms 32 and 34 by means of pivot fasteners 33 extending between one end of each of arms 32 and 34 and a mounting bracket 36 to which visor panel 22 is pivotally coupled by means of a pivot rod assembly 37 to permit fore and aft adjustment of the visor panel 22 when in a lowered position, as shown in FIG. 1. The opposite end of pivot arms 32 and 34 are pivotally coupled to a cross arm 38 which is generally U-shaped having end tabs 39 slightly off-set from the body of cross arm 38 and including apertures therein which align and are pivotally coupled to the opposite ends of arms 32 and 34 by means of pivot fasteners 40. As disclosed in the above identified application, the cross arm 38 which is mounted to arms 32 and 34 in an off-set manner provides stability and ease of operation for the swing-down operation of the visor panel 22 when moved from a stored position concealed within the vehicle headliner to a lowered use position. Arms 32 and 34 are pivotally secured to spaced locations of the vehicle headliner and specifically to a sheet metal panel 42 by means of pivot pins 31 and 35 extending upwardly from the elbow portion of arms 32 and 34, as shown in FIG. 2. Pins 31 and 35 extend through sleeve bushings 41 and 45, respectively, which are, in turn, fitted within collars 43 and 47 welded or force fitted within panel 42, as seen in FIG. 2. Pivot pins 31 and 35 are held in position by means of C-shaped spring clips 44 and 46 which fit within annular grooves 31' and 35' formed near the upper edge of pivot pins 31 and 35, respectively, when the unit is assembled (FIG. 3). Panel 42 can be an integral part of the sheet metal headliner of the vehicle or, as disclosed in the preferred embodiment, a separate assembly which in turn is fastened to the sheet metal roof of the vehicle in a conventional manner such as by sheet metal screws or the like.

The visor assembly, as seen in FIG. 2, is shown in the lowered position and moves to such position about pivot pins 31 and 35 in a direction indicated by arrow A, in FIG. 2, to move downwardly and slightly toward the side of the vehicle adjacent post 13 (FIG. 1). When moved upwardly in a general direction indicated by arrow B, from the lowered use position to the stored position concealed within the vehicle headliner, it rotates about pins 31 and 35 in a direction opposite arrow A. Having described the pivoted arm construction of the visor raising and lowering mechanism, a description follows of the unique mechansim by which the visor can be automatically lowered from a stored position by reference to FIGS. 2 and 3.

The visor control mechanism 50 includes a coil spring 52 which has an inner diameter large enough to permit the spring to extend coaxially over collar 43, as seen in the installed position of FIG. 3, with one end 51 of the spring inwardly turned along the center thereof to fit within a notch 43' of collar 43 to anchor the spring and prevent rotation of the spring around the collar once installed. C-clip 44 holds the spring in axial alignment over the collar, once installed, with end 51 seated within notch 43'. The opposite end 53 of spring 52 extends outwardly, as seen in FIG. 2, and selectively engages a cam in the form of a pin 60 extending upwardly from the leg 61 segment of arm 32. When the visor is in the lowered position, as seen in FIG. 2, spring arm 53 substantially disengages pin 60 when, however, the visor is moved to a raised position, as illustrated in FIG. 3, pin 60 engages arm 53 tending to rotate the arm in a direction indicated by arrow C to compress the coil spring which, in turn, provides a spring force in a direction indicated by arrow F in FIG. 3 which, unless the arms are latched, urges the interconnected parallel arms 32 and 34 to pivot around pivot point 31 and 35 in a direction opposite arrows A and C, namely, toward a visor lowering position. Spring 52 is formed, in the preferred embodiment, such that end 53 extends tangentially outwardly at a point along the outer periphery of the spring to disengage cam 60 when arm 32 has rotated about 90° corresponding to the visor being lowered approximately half-way. Thus, the spring end 53 will stop in the position shown in FIG. 2.

In order to hold the visor in a concealed stored position and latched against bias spring 52, a latching assembly 70 is provided and includes a latching bar 72 having one end pivotally coupled to plate 42 by means of a pivot pin 71 (FIG. 2) and extending outwardly therefrom and including a pin receiving slot 74 for releasably engaging a latch pin 64 extending upwardly from end 61 of pivot arm 32, as best seen in FIG. 3. Arm 72 also includes upwardly projecting pin 73 which is coupled to the end of a plunger 76 of an electrically operated solenoid 78. Solenoid 78 is mounted to plate 42 by means of an angled mounting bracket 80 by conventional mounting hardware 82 and is spring loaded with plunger 76 extending outwardly. Bracket 80 is, in turn, secured to plate 42. The end of solenoid armature 76 includes a slot 77 formed therein for receiving pin 73 which is captively held therein by means of a transversely extending roll pin 81 extending in apertures on opposite edges of slot 77 in the end of armature 76 to hold the pin 73 within slot 77, as best seen in FIG. 3.

With the solenoid in a non-actuated position, the spring-loaded solenoid urges the latching arm into a latching position, as shown in FIG. 3. The end of arm 72, opposite pivot pin 71, includes a curved camming surface 75 such that as the visor is manually returned to its stored position, pin 64 will ride over camming surface 75 permitting the latch arm to pivot and pin 73 to extend into the slot 74. Solenoid 78 is electrically coupled to the vehicle's power system by means of a pushbutton switch 84 which, as seen in FIG. 1, can be conveniently mounted to the vehicle headliner to be easily accessible by the vehicle occupant. Suitable interconnecting electrical wires 85 couple switch 84 to solenoid 78 as well and to the vehicle power source (not shown).

When the momentarily actuated spring-loaded pushbutton switch 84 is actuated and the visor is in a cocked position, as shown in FIG. 3, plunger 76 retracts within the body of solenoid 78 pivoting latching arm 72 in a direction indicated by arrow D in FIG. 3 releasing pin 64 permitting the spring 52 to pivot the visor assembly toward the lowered use position. The momentum of the visor will cause it to lower to a fully extended position. The spring end 53, however, with the visor in a partially lowered position, disengages pin 60 such that the visor can be manually adjusted up and down a significant portion of its travel without spring 52 urging it downwardly. When lowered fully, as illustrated in FIG. 1, the visor body 22 can be pivoted about pivot 37 permitting fore and aft adjustment of the visor as well.

It will become apparent to those skilled in the art that the spring biasing of the visor control assembly and the releasable actuation of the spring-loading mechanism can be positioned on either of arms 32 or 34 or at other locations between the moveable visor control elements and the stationary plate 42 or the vehicle itself. These and other modifications to the preferred embodiment will, however, fall within the spirit or scope of the invention as defined by the appended claims.

The embodiments of the invention in which an exclusive property or privilege is claimed are defined as follows:

1. A visor actuating mechanism for use with a visor assembly including a visor body and means for movably mounting the visor body to a vehicle for movement between stored and use positions, said actuating mechanism comprising:

bias means having one end coupled to said mounting means for urging the visor body toward the use position and selective coupling means for disengagably coupling an opposite end of said bias means to said visor body such that said visor moves free of said bias means upon movement of said visor body a predetermined distance from said stored position; and means for releasably holding the visor body in a stored position against the force provided by said bias means such that the visor can be automatically moved from a stored position by actuating said holding means to release the visor body.

2. A visor actuating mechanism for use with a visor assembly including a visor body and means for movably mounting the visor body to a vehicle for movement between stored and use positions, said moving means including first and second elements movable with respect to each other, said actuating mechanism comprising:

bias means coupled to said mounting means for urging the visor body toward the use position, wherein said bias means comprises a spring and first coupling means for coupling one end of said spring to said first element and second coupling means for coupling an opposite end of said spring to said second element, and wherein said second coupling means selectively disengages said spring from said second element upon movement of said visor body a predetermined distance; and means for releasably holding the visor body in a stored position against the force provided by said bias means such that the visor can be automatically moved from a stored position by actuating said holding means to release the visor body.

3. The apparatus as defined in claim 2 wherein said holding means comprises a catch coupled to one of said moveable elements to prevent its movement when the visor is in a stored position.

4. The apparatus as defined in claim 3 wherein said one of said moveable elements includes a pin and said latch includes an arm having a notch formed therein for captively holding said pin and means for moving said arm.

5. The apparatus as defined in claim 4 wherein said arm is pivotally mounted to a stationary member of said visor assembly and said means for moving said arm includes an electrically actuated solenoid for holding said arm in a first pin holding position and pivoting said arm to release said pin when said solenoid is actuated.

6. A visor actuating mechanism for use with a visor comprising:
   a visor assembly including a visor body and a pair of substantially parallel arms for moving the visor body between stored and use positions including means for pivotally coupling said arms between the vehicle and visor body to permit movement of said visor body between a stored position and a use position;
   bias means extending between one of said arms and a stationary member on the vehicle to urge said visor body toward the use position; and
   latch means for releasably holding said visor body in a stored position against the force of said bias means.

7. The apparatus as defined in claim 6 wherein said bias means comprises a spring and coupling means for selectively coupling an end of said spring to said one arm.

8. The apparatus as defined in claim 7 wherein said coupling means selectively disengages said spring from said arm upon movement of said visor body a predetermined distance.

9. The apparatus as defined in claim 8 wherein said latch means comprises a catch coupled to said arm to prevent its movement when the visor is in a stored position.

10. The apparatus as defined in claim 9 wherein said arm includes a pin and said latch includes an arm having a notch formed therein for captively holding said pin and means for moving said arm.

11. The apparatus as defined in claim 10 wherein said arm is pivotally mounted to a stationary member of said visor assembly and said means for moving said arm includes an electrically actuated solenoid for holding said arm in a first pin holding position and pivoting said arm to release said pin when said solenoid is actuated.

12. A visor assembly comprising:
   a visor body;
   a visor control adapted to be mounted to a vehicle headliner for mounting the visor body thereto for translating said visor body in a pivoting manner in a plane generally parallel to a vehicle window between a raised stored position and a lowered use position;
   bias means coupled to said visor control for urging the visor body toward the use position; and
   means for releasably holding the visor body in a stored position against the force provided by said bias means such that the visor can be automatically moved from a stored position by actuating said holding means to release the visor body.

13. The apparatus as defined in claim 12 wherein said visor control includes at least one pivot and an element pivoted about said pivot and said bias means comprises a coil spring positioned coaxially on said pivot and anchored thereto, said spring having an end selectively coupled to said element.

14. The apparatus as defined in claim 13 wherein said end of said spring selectively disengages from said element upon movement of said visor body in a predetermined distance.

15. The apparatus as defined in claim 14 wherein said holding means comprises a catch coupled to said element to prevent its movement when the visor is in a stored position.

16. The apparatus as defined in claim 15 wherein said element includes a pin and said latch includes an arm having a notch formed therein for captively holding said pin and means for moving said arm.

17. The apparatus as defined in claim 16 wherein said arm is pivotally mounted to a stationary member of said visor assembly and said means for moving said arm includes an electrically actuated solenoid for holding said arm in a first pin holding position and pivoting said arm to release said pin when said solenoid is actuated.

* * * * *